(12) United States Patent
Greenspan et al.

(10) Patent No.: US 9,304,584 B2
(45) Date of Patent: Apr. 5, 2016

(54) SYSTEM, APPARATUS, AND METHOD FOR IDENTIFYING RELATED CONTENT BASED ON EYE MOVEMENTS

(75) Inventors: Steven L. Greenspan, Scotch Plains, NJ (US); Carrie E. Gates, New York, NY (US)

(73) Assignee: CA, Inc., New York, NY (US)

(*) Notice: Subject to any disclaimer, the term of this patent is extended or adjusted under 35 U.S.C. 154(b) by 928 days.

(21) Appl. No.: 13/485,338

(22) Filed: May 31, 2012

(65) Prior Publication Data
US 2013/0325463 A1 Dec. 5, 2013

(51) Int. Cl.
G06F 3/00 (2006.01)
G06F 3/01 (2006.01)
G06F 3/0484 (2013.01)
G06F 17/30 (2006.01)

(52) U.S. Cl.
CPC ............ *G06F 3/013* (2013.01); *G06F 3/04842* (2013.01); *G06F 17/30873* (2013.01)

(58) Field of Classification Search
CPC ............................. G06F 3/013; G06F 3/04842
See application file for complete search history.

(56) References Cited

U.S. PATENT DOCUMENTS

| | | | |
|---|---|---|---|
| 7,337,396 B2 | 2/2008 | Rosenholtz et al. | |
| 7,617,193 B2 | 11/2009 | Bitan et al. | |
| 7,756,879 B2 | 7/2010 | Parsons et al. | |
| 7,756,887 B1 | 7/2010 | Haveliwala | |
| 7,765,184 B2 | 7/2010 | Makela | |
| 7,831,913 B2 | 11/2010 | MacLaurin | |
| 7,882,097 B1 | 2/2011 | Ogilvie | |
| 7,903,884 B2 | 3/2011 | Okubo et al. | |
| 7,925,644 B2 | 4/2011 | Lin et al. | |
| 2006/0136409 A1 | 6/2006 | Leidig | |
| 2007/0219986 A1 | 9/2007 | Egozi | |
| 2008/0148147 A1 | 6/2008 | Poston et al. | |
| 2009/0106221 A1 | 4/2009 | Meyerzon et al. | |
| 2009/0112810 A1 | 4/2009 | Jung et al. | |
| 2009/0281990 A1 | 11/2009 | Greenspan et al. | |
| 2010/0039618 A1 | 2/2010 | De Lemos | |
| 2010/0191727 A1 | 7/2010 | Malik | |
| 2011/0066619 A1 | 3/2011 | Perantatos et al. | |
| 2011/0078194 A1 | 3/2011 | Helfman et al. | |
| 2011/0087659 A1 | 4/2011 | Dey et al. | |
| 2013/0147838 A1* | 6/2013 | Small et al. | 345/633 |

* cited by examiner

*Primary Examiner* — Zachary K Huson
(74) *Attorney, Agent, or Firm* — Baker Botts L.L.P.

(57) ABSTRACT

An apparatus, system, and method for identifying related content based on eye movements are disclosed. The system, apparatus, and method display content to a user concurrently in two or more windows, identify areas in each of the windows where a user's eyes focus, extract keywords from the areas where the user's eyes focus in each of the windows, search a communications network for related content using the keywords, and notify the user of the related content by displaying it concurrently with the two or more windows. The keywords are extracted from one or more locations in the two or more windows in which the user's eyes pause for a predetermined amount of time or, when the user's eyes pause on an image, from at least one of the text adjacent to and the metadata associated with that image.

20 Claims, 3 Drawing Sheets

FIGURE 3

SYSTEM, APPARATUS, AND METHOD FOR IDENTIFYING RELATED CONTENT BASED ON EYE MOVEMENTS

BACKGROUND OF THE INVENTION

A. Field of the Invention

The present disclosure generally relates to information sharing. The disclosed embodiments relate more specifically to a system, apparatus, and method for identifying related content based on eye movements.

B. Related Technology

With advances in technology and network capabilities, people have access to more information than ever before. But if massive amounts of information are communicated to users directly, those users may experience information overload and either ignore or fail to recognize useful information. On the other hand, if users are left to search and find information for themselves, they may be unable to effectively find helpful information among the overabundance of available information. Accordingly, it is difficult for users to utilize that overabundance of information efficiently.

In response, software applications have been developed that extract keywords from documents, web pages, and e-mails using summarization and keyword spotting algorithms. Those techniques use word frequency, part of speech, and other formal properties of the text, or the semantics of a specified domain, to determine a candidate list of keywords. The purpose of that keyword extraction is typically to semantically index documents for later retrieval using keyword-based search algorithms. However, the keywords identified with those techniques and algorithms are based on the content of documents, web pages, and e-mails, as a whole. But in long documents, web pages, and e-mails; or across many documents, websites, and e-mails that a user is concurrently viewing: not all of the content may be relevant to the user. Accordingly, the keywords extracted using conventional techniques and algorithms are more likely to reflect the interests of the author of the content than the interests of the reader of the content.

Similarly, software applications have been developed that use various forms of implicit feedback to identify areas of interest to users. Those software applications evaluate such things as click-stream data, time spent during reading, amount of scrolling, and exit behavior to help in predicting potential areas of interest for that user. Nevertheless, those software applications offer limited information about a user's actual interests and intentions because they do not take into account the content on which the user actually focused.

BRIEF SUMMARY OF THE INVENTION

To address the shortcomings of the prior art discussed above and to provide at least the advantages discussed below, the present disclosure is directed to a system, apparatus, and method for identifying related content based on eye movements so as to facilitate more accurate and efficient delivery of information to a user. The system, apparatus, and method display content to a user concurrently in two or more windows, identify one or more areas in each of the two or more windows where a user's eyes focus, extract one or more keywords from the one or more areas where the user's eyes focus in each of the two or more windows, search a communications network for related content using the one or more keywords, and notify the user of the related content by displaying it concurrently with the two or more windows. The one or more keywords are extracted from one or more locations in the two or more windows in which the user's eyes pause for a predetermined amount of time or, when the user's eyes pause on an image, from at least one of the text adjacent to and the metadata associated with that image. Those keywords are used to search the communications network based on the number instances in which they are extracted from the two or more windows and weighted by the number of windows from which they were extracted.

The system, apparatus, and method may also rank the related content identified by the search based on relevancy, popularity, and/or urgency. For example, content may be identified as being more relevant when it was previously viewed by a user when identified as related data in response to the same or a similar search, and content may be identified as being less relevant when that content was previously not viewed by a user when identified as related data in response to the same or similar search. Further, the related content may be filtered based on user preferences, organizational roles, and/or access controls. In addition, the system, apparatus, and method may generate a user profile that includes the user's interests and/or organizational role, wherein each user profile is updated when the corresponding user views any portion of the related content and/or a user with the same or similar interests views any portion of the related content.

Those and other objects of the disclosed embodiments, as well as many of the intended advantages thereof, will become more readily apparent with reference to the following detailed description, taken in conjunction with the accompanying drawings. Moreover, while specific advantages have been enumerated above, various embodiments may include all, some, or none of those enumerated advantages.

BRIEF DESCRIPTION OF THE DRAWINGS

Illustrative aspects of the disclosed embodiments are described in detail with reference to the following figures, which form part of the disclosure, wherein:

FIG. 3 is a schematic diagram illustrating an example of a graphical display according to a non-limiting embodiment of the present disclosure.

In those figures, like reference numerals refer to like parts, components, structures, and/or processes.

DETAILED DESCRIPTION

Figure 1:
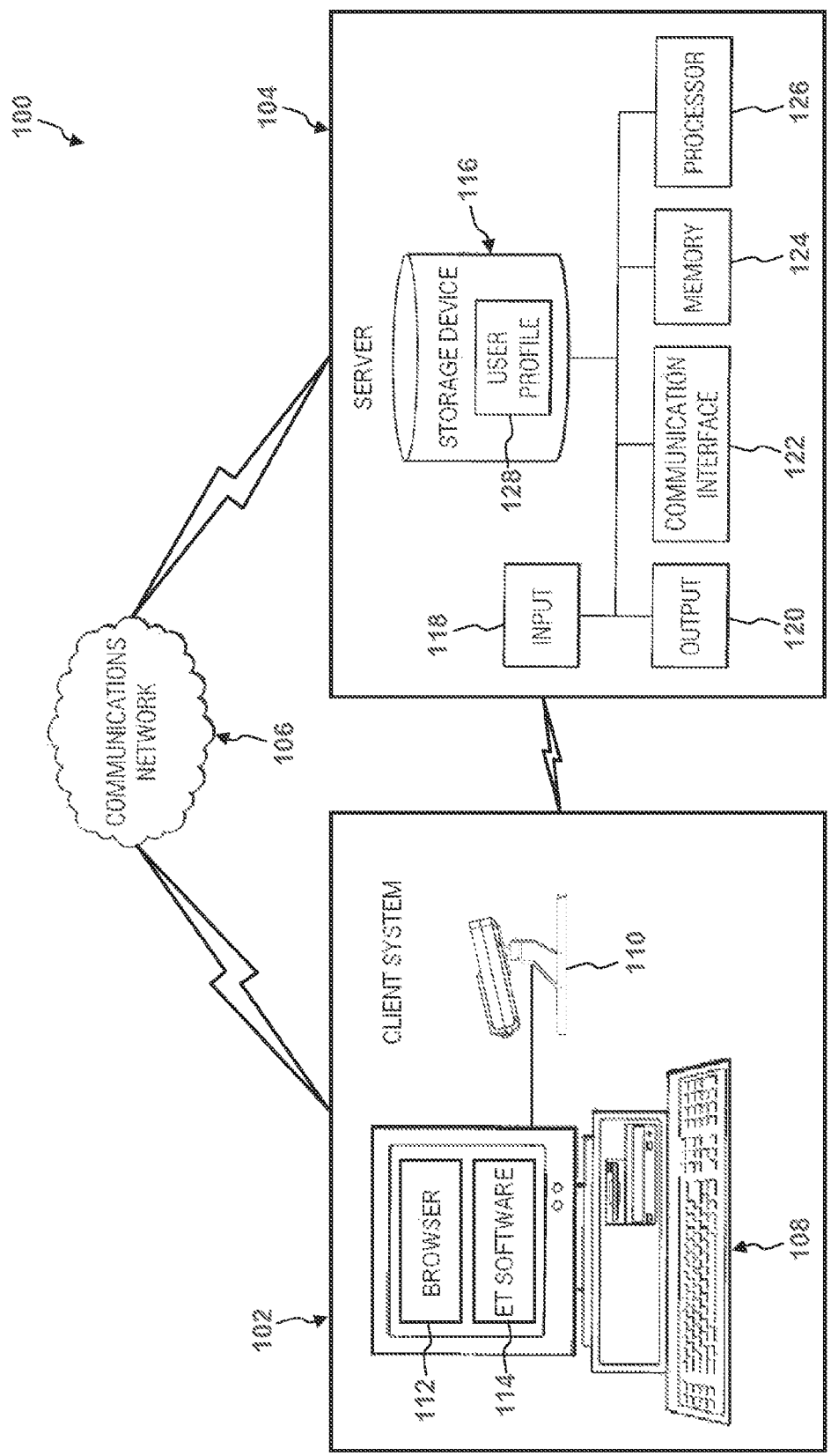
FIG. 1 is a schematic diagram illustrating an example of a communications system according to a non-limiting embodiment of the present disclosure.

In an enterprise environment, a wealth of information about corporate projects may be available via web pages, wikis, and other similar network sites. However, one user may not know that another user is engaged in a particular project and, therefore, may not know to look for information about that project at those network sites. Accordingly, different businesses, or different business units within the same business, may end up working on similar problems with no coordination. Similarly, users may miss relevant meetings, forums, workshops, etc. because they are unaware of that event.

Knowledge sharing across teams and business units may be useful for creating efficiency and innovation in the workplace. Traditional methods of knowledge sharing generally utilize "push" or "pull" technologies. Push technology refers to communications originating from a server or other central source and may come in the form of broadcast e-mails. Such direct communications may lead to information overload by presenting information that is not always relevant to a particular user. Pull technology, on the other hand, refers to communications that are requested by an individual user. Pull technology may be embodied by intranet portals, wikis, blogs, or shared bookmarks. However, users may still miss out on relevant information because that approach relies on a user's active efforts to seek out information for themselves. By contrast, the present disclosure provides a system, apparatus, and method for more accurately determining a user's interests from the content on which he or she actually focuses, and for presenting related information to that user in a meaningful manner.

Several example embodiments are disclosed herein for illustrative purposes, it being understood that the invention may be embodied in other forms not specifically described or illustrated in the drawings. And in describing the embodiments illustrated in the drawings, specific terminology is resorted to for the sake of clarity. However, the disclosed embodiments are not intended to be limited to the specific terms so selected, and it is to be understood that each specific term includes all technical equivalents that operate in similar manner to accomplish a similar purpose.

A. Communications System 100

Turning to the drawings, FIG. 1 is a schematic diagram illustrating an example of a communications system 100 according to a non-limiting embodiment of the present disclosure. That communications system 100 includes one or more client systems 102, one or more servers 104, and one or more communications networks 106. Each client system 102 is configured to provide a user with access to an abundance of information (e.g., files, network sites, and other content) available within the communications system 100; each server 104 is configured to host at least a portion of the abundance of information and to make that information available to users within the communications system 100; and each communications network 106 is configured to connect the one or more client systems 102 and the one or more servers 104 with other communications devices (not shown) that may host other portions of the abundance of information. The one or more client systems 102 and the one or more servers 104 are placed in electronic data communication with each other and with the communications network 106 via a suitable network connection (e.g., a local area network (LAN) connection, a wide area network (WAN) connection, a virtual private network (VPN) connection, etc.) using a suitable network communications protocol (e.g., the Transmission Control Protocol (TCP), the Internet Protocol (IP), etc.).

1. Client System 102

The client system 102 includes a graphical user interface (GUI) 108 and an eye tracker 110. The GUI 108 is configured to provide users with access to the communications system 100 and to allow the user to interact with the communications devices within the communications system through direct manipulation of elements presented in a graphical display (e.g., FIG. 3, Item 300). And the eye tracker 110 is configured to monitor and collect gaze data from a user based on that user's eye movements as he or she utilizes the GUI 108 to access the communications system 100 and interact with various communications devices.

The GUI 108 may be any suitable communications device with a storage device, an input device, an output device, a communication interface, a memory device, and a processor that are capable of supporting the functionality of the GUI 108 described below (e.g., a desktop computer, a laptop computer, a tablet computer, a personal digital assistant (PDA), a smart phone, a multimedia tablet, etc.). Examples of such storage devices, input devices, output devices, communication interfaces, memory devices, and processors are described in more detail below with respect to the server 104. And the eye tracker 110 may be any suitable eye tracking device capable of interfacing with the GUI 108 and supporting the functionality of the eye tracker 110 described below (e.g., the X120 portable eye tracker from Tobii Technology, Inc.; the SEETECH PRO brand portable eye tracker from HumanElektronik GmbH; the EYELINK II brand head-mounted eye tracker from SR, Inc.; the EC7T head-mounted eye tracker from Eye-Com Corporation; etc.). Although the GUI 108 and the eye tracker 110 are illustrated as being separate devices in FIG. 1, they may also be provided as a single, integrated device (e.g., the TX300 integrated GUI/eye tracker from Tobii Technology, Inc.; the VISION TRACKER VT1 brand integrated GUI/eye tracker from EyeTech Digital Systems, Inc.; etc.).

The GUI 108 includes a browser 112 and eye tracking (ET) software 114 that are stored on the memory device and executed by the processor to support the functionality of the GUI 108 and the eye tracker 110. The browser 112 is configured to facilitate the standardized retrieval and traversal of information to and from the server 104 and the other communications devices within the communications system 112, and to present that information to a user in a graphical display on the GUI 108. The browser 112 supports various other applications that are stored on the memory device and executed by the processor, such as word processing applications, multimedia applications, web browser applications, calendar applications, and e-mail applications.

For example, the browser 112 allows a user to retrieve documents stored on the storage device 116 of the server 104 and modify them with a word processing application; to create multimedia projects with a multimedia application and store them on the storage device 116 of the server 104; to retrieve content, view, and/or publish content to/from the Internet with a web browser application; to schedule calendar events with multiple users of the communications system 100 with a calendar application; and to send and receive electronic mail to other users within the communications system 100 with an e-mail application. The browser 112 also allows a user to utilize multiple different applications and/or multiple instances of the same application concurrently. For example, a user can work on multiple documents concurrently by opening multiple instances of the word processing application while, at the same time, opening one or more instances of the web application and concurrently browsing one or more different network sites. Moreover, the browser 112 allows a user to view multiple different applications and/or instances of the same application at the same time in a graphical display on the GUI 112 (e.g., FIG. 3, Item 300). Accordingly, a user can quickly access and move between multiple different applications without the need to open and/or close any of those applications each time the user moves from one application to another.

The ET software 114 is configured to track a user's gaze patterns with the eye tracker 110 as that user's eyes move across the graphical display generated with the browser 112, to identify the particular items (e.g., words, graphical images, etc.) and/or locations in that graphical display on which that user's eye focus when viewing that graphical display, and to store the associated gaze data on the storage device of the GUI 108. The ET software 114 identifies those fixation locations from eye movement trajectories measured with the eye tracker 110. For example, the ET software 114 may use a technique known as windowing, wherein successive points of eye trajectory are measured and, if those points remain within a predefined area on the graphical display (e.g., a 30 pixel by 30 pixel window) for a predefined period of time (e.g., ≥0.04 seconds), that area is identified as one of the user's points of interest. The ET software 114 then maps the item or items closest to that area and extracts the corresponding textual data from that item for use as keywords in a search for related content, as described in more detail below with respect to the method for identifying related content 200 illustrated in FIG. 2. If a user focuses on one area for a longer period than another, the items within that area may be weighted more heavily as points of interest when identifying other relevant material. And if no item is located within an area identified as a point of interest, that area will be discarded as a point of interest.

The eye tracker 110 measures eye movement trajectories by illuminating both eyes using a light source with a specific wavelength (e.g., an infra-red LED) and measuring that light's reflection from a user's corneas with a pair of cameras. Those measurements are taken in rapid succession (e.g., every 0.02 seconds) so that even small periods of fixation (e.g., 0.04 seconds) can be identified. The eye tracker 110 can be mounted to the GUI 112 or worn on a user's head as a pair of glasses. But because a user's eye movement trajectories are largely a factor of angular movement, which depends on the distance of the user's head from the GUI 112, the eye tracker 110 is preferably mounted to the GUI 112 so sufficient horizontal separation (e.g., 60 cm) can be provided between the eye tracker 110 and the user's head. Regardless of the configuration of the eye tracker 110, it can be calibrated to work properly with the ET software 114 based on the distance of the user's head from the GUI 112 whenever that distance changes.

2. Server 104

The server 104 includes a storage device 116, an input device 118, an output device 120, a communication interface 122, a memory device 124, and a processor 126. The storage device 116 is configured to store data and instructions for performing the various processes that support the functionality of the server 104 and may include, for example, a magnetic disk, a flash memory, an optical disk, a digital video disk (DVD), a removable storage media, any other suitable data storage device, or a combination of any of the preceding storage devices. The input device 118 is configured to facilitate the input, selection, and/or manipulation of various data and information and may include, for example, a keyboard, mouse, graphics tablet, joystick, light pen, microphone, scanner, touch screen, or other device capable of supporting that functionality. The output device 120 is configured to present and/or display data to a user and may include, for example, a video monitor, a printer, a plotter, or any other device capable of supporting that functionality. The communication interface 122 is configured to receive input to the server 104, to send output from the server 104, to perform suitable processing of that input and/or output, and to communicate with other communications devices within the communications system 100 and includes the appropriate hardware (e.g., a modem, a serial port, a network interface card, etc.) and software (e.g., protocol conversion software, data processing software, etc.) for supporting that functionality. The memory device 124 is configured to store and facilitate retrieval of data and may include, for example, a random access memory (RAM), a read only memory (ROM), any other suitable memory device, or a combination of any of the preceding memory devices. The processor 126 is configured to execute instructions and manipulate data to perform the various operations of the server 104 and may include, for example, any type of central processing unit (CPU).

The storage device 116 stores a user profile 128 for each user within an enterprise. And each user profile 128 includes information about that user, including that user's activities, that user's organizational role within the enterprise, and that user's interests. The user profile 128 is used to search for other information relevant to the user's activities, organizational role, and/or interests and to present that information to the user in a meaningful manner. Although a single user profile is illustrated in FIG. 1, the storage device 116 may store a plurality of user profiles 128 for a corresponding plurality of users within the enterprise. In addition, such user profiles 128 may be stored in various locations other than storage device 116, such as on the memory device of a user's GUI 108.

3. Communications Network 106

The communications network 106 includes a collection of terminals, links, and nodes that connect together to enable electronic data communication and resource sharing between various communications devices within the communications system 100 and across the Internet. The communications network 106 includes a plurality of servers 104 and GUIs 108 used or shared by one or more businesses or enterprises within a secured network, such as an intranet or an extranet. The server 104 and GUI 108 illustrated in the embodiment of FIG. 1 are part of that secured network maintained by a particular business or enterprise and is referred to hereinafter as "the enterprise network." The communications system 100 also includes one or public networks, such as the Internet. Accordingly, the servers 104 and GUIs 108 within the enterprise network are preferably provided behind a firewall to protect them from untrustworthy communications devices on the Internet. And although only one server 104 and one GUI 108 are illustrated in the embodiment of FIG. 1, the enterprise network and the communications network 106 may each include a plurality of servers 104 and GUIs 108.

B. Method for Identifying Related Content 200

Figure 2:
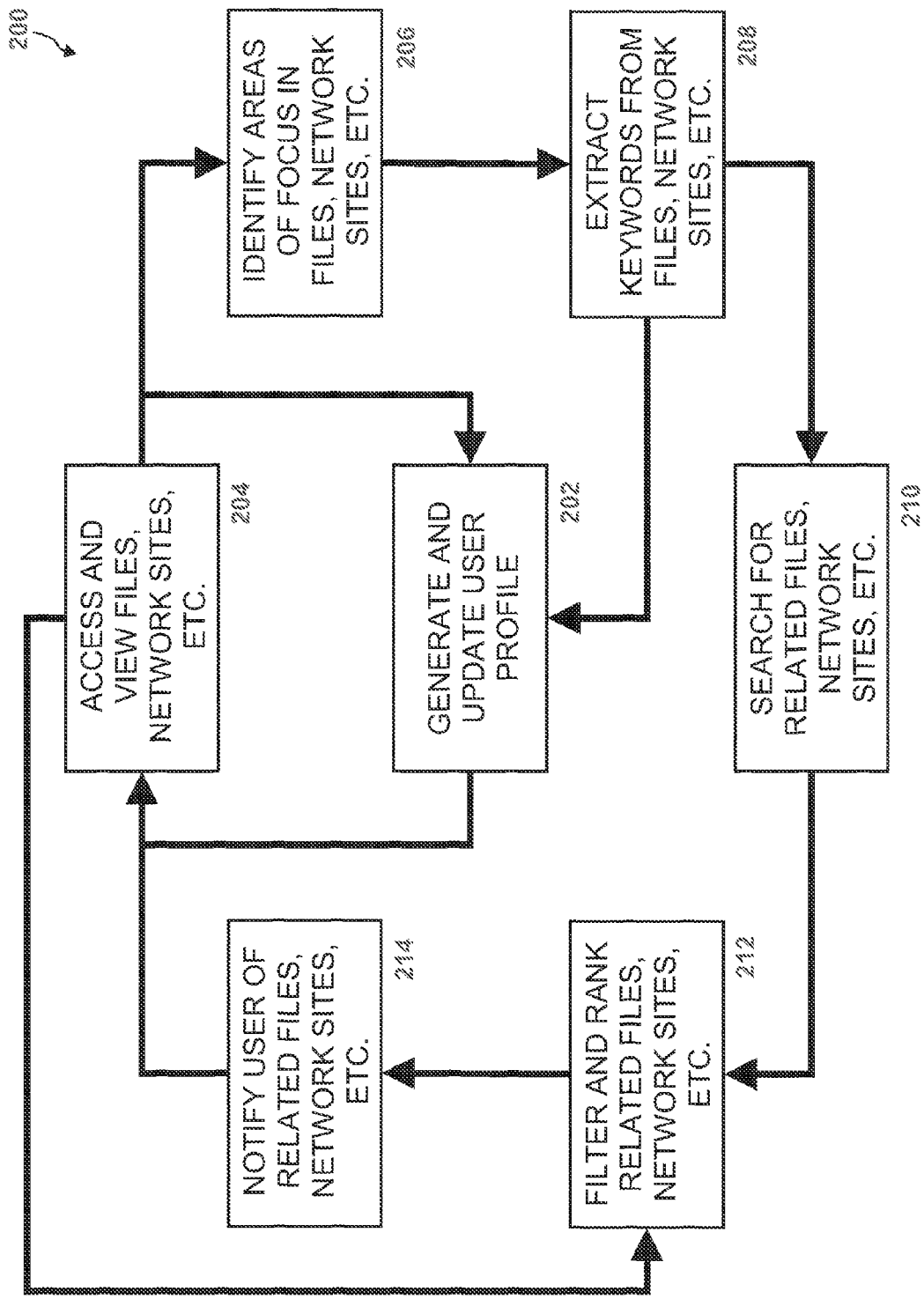
FIG. 2 is a flow diagram illustrating an example of a process for identifying related content within a communications system according to a non-limiting embodiment of the present disclosure.
Figure 3:
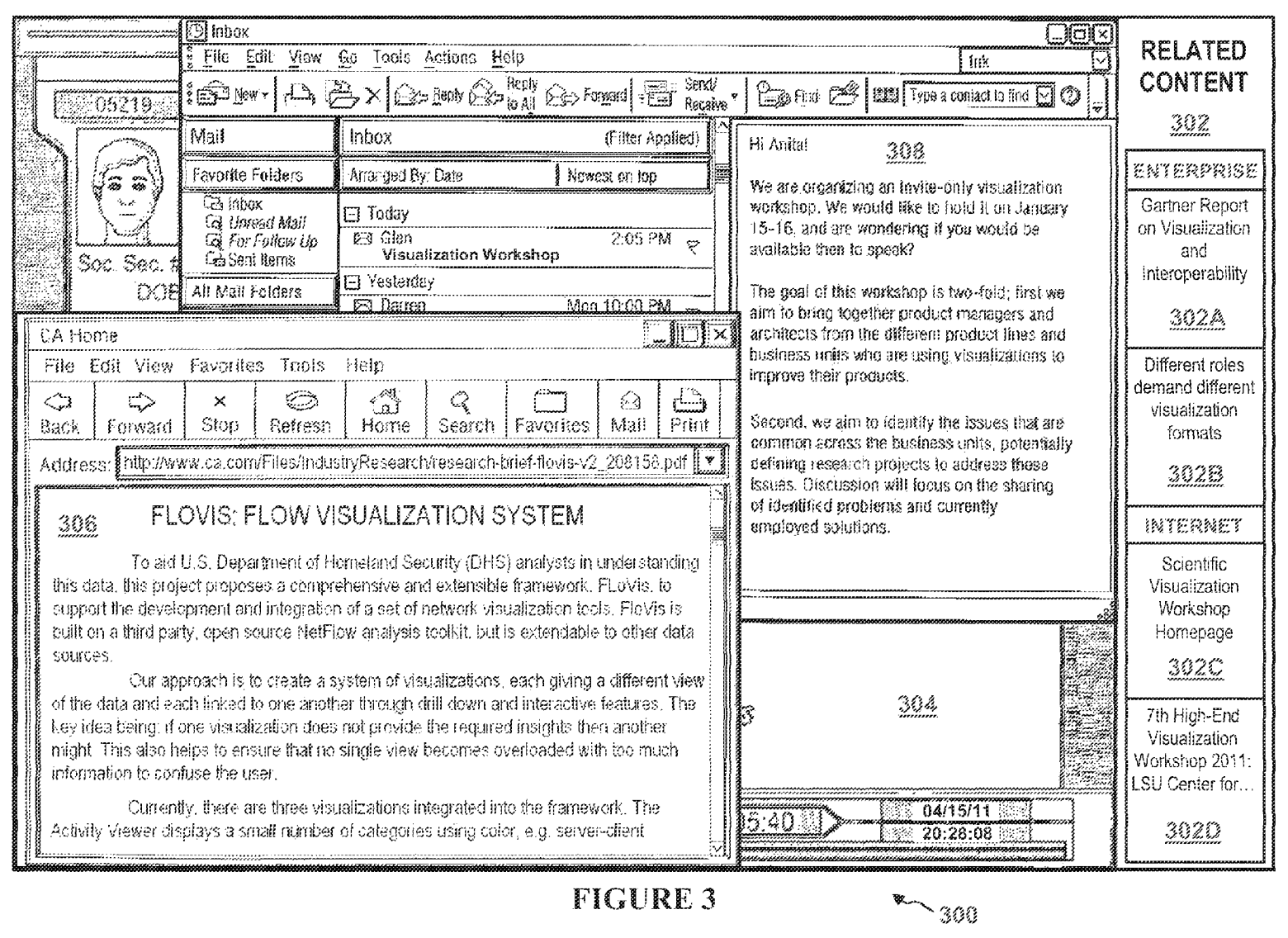

FIG. 2 is a flow diagram illustrating an example of a process for identifying related content 200 within the communications system 100 according to a non-limiting embodiment of the present disclosure. The specific steps of that process are further discussed with respect to FIG. 3. FIG. 3 is a schematic diagram illustrating an example of a graphical display 300 according to a non-limiting embodiment of the present disclosure.

1. Step 202: Generate and Update User Profile

At step 202 of the process for identifying related content 200, a user profile 128 is generated for a user. As noted above, the user profile 128 includes information about a user's activities and interests. Information about a user's activities includes, but is not limited to, information regarding electronic documents, or other electronic files, that the user has viewed, saved, created, or edited with a GUI 108, and websites, or other network sites, that the user has viewed, created, or edited with a GUI 108. And information about a user's interests includes, but is not limited to, keywords that have been extracted from the electronic files, network sites, and other content the user has viewed, saved, created, or edited with a GUI 108, and that user's tendencies for accessing and viewing certain content. While some of that information may be found on a GUI 108 that the user is logged on to, some of that information may also reside elsewhere within the communications system 100, such as on the server 104, on servers 104 and GUIs 108 within the communications network 106, and/or on other communications devices within the communications system 100. More generally, a user's user profile 128 includes data that can be analyzed by the processor of the GUI 108 and/or the processor 126 of the server 104 to determine what subjects are of particular relevance or interest to that user using various algorithms and/or data gathering software.

As also noted above, the user profile 128 includes information about a user's organizational role. Information about a user's organizational role includes, but is not limited to, details regarding the user's role in a chain of command for security issues. For example, that information may include information about the electronic files, network sites, and/or projects to which that user has been granted access. It may also include information about governance, risk, and compliance (GRC) that is used by the organization or enterprise to focus on and manage governance, risk, and compliance. The former example of organizational role information may be predefined within the user profile 128, it may be determined from project management or similar software, it may be determined from the network sites that the user has viewed and/or created, and/or it may be determined from the electronic files that the user has viewed, saved, created, or edited. And the latter example of organizational role information may be determined from enterprise software that helps the organization or enterprise maintain compliance with legal requirements, such as those defined by the Sarbanes-Oxley Act.

The information in a user profile 128 about a user's activities, organizational role, and/or interests may also be generated based on the activities, organizational role, and/or interests of other users within the communications system 100. For example, one user may be associated with another user based on similarities between their user information (e.g., similar viewing histories, similar interests, similar organizational roles, etc.) or based on their professional associations (e.g., users with the same organizational role, members of the same team or business unit within an organization or business unit, users from different companies working on a collaborative project via a common extranet or secured network, etc.). Accordingly, as files, network sites, and other content is identified as being of interest to one user, it will also be identified as being of interest to the other user. Generating user profiles 128 in that manner not only enlarges the scope of user information gathered for each user, it also allows one user to enjoy the benefits of another user's research efforts.

When a user's user profile 128 is generated at step 202, it is stored on one or both of the storage device 116 of the server 104 and the storage device of the user's GUI 108. Preferably, it is at least stored on the storage device 116 of the server 104 so it can be easily accessed at a central location, along with a plurality of other user profiles 128. Allowing a plurality of user profiles 128 to be accessed from a central location allows a user to log on to different GUIs 108 within an enterprise network without the need for that user to physically carry a portable storage device (e.g., a flash memory device, a DVD, etc.) with his or her user profile 128 stored on it from one GUI 108 to another. Moreover, it allows the processor 126 on the server 104 to update those user profiles 128 based on their similarities with the activities, organizational roles, and/or interests set forth in other user profiles 128, as discussed above. In that manner, the server 104 can actively maintain and update a user's profile at step 202 based not only on that user's activity within the communications system 100, but also on other users' activity within the communications system 100.

In addition, a user may edit his or her own user profile 128 at step 202 to specify what information will be used in generating his or her user profile 128, what format the resulting related content will be presented to that user, and the scope of the related content that will be presented to that user. The following are three illustrative examples of such editing: (1) a user may choose whether or not to have his or her user profile 128 updated based on other users' activity and which activities to monitor when creating or updating his or her user profile 128; (2) a user may choose the manner in which related content is presented to that user (e.g., via links, windows, tabs, pop-ups, e-mails, etc.) and the location in a graphical display that the related content is displayed (e.g., in a fixed window at the top, bottom, or side of a screen; in a window that auto-fits to an open area between other windows; in a window selectable from a taskbar, etc.); and (3) a user may choose the types of the related content (e.g., e-mails, calendar events, internal documents, etc.) and the subject matter of the related content (e.g., upcoming meetings and forums, internal reports, etc.) that will be presented to that user. Such editing may be accomplished by way of the creation, deletion, and editing of rules or other suitable mechanisms.

The first example of a user editing his or her own user profile 128 is particularly useful when that user also utilizes a GUI 108 within an organization or enterprise for personal web surfing and e-mail because it allows the user to edit his or her profile to exclude that personal information (e.g., personal e-mails, web history, etc.) such that only work-related content will be used to generate or update his or her user profile 128. In more detail, a user can identify specific network sites (e.g., www.gmail.com, www.aol.com, www.huffingtonpost.com, etc.), specific web browsers (e.g., the NETSCAPE brand web browser, the FIREFOX brand web browser, the INTERNET EXPLORER brand web browser, etc.), and/or specific storage device locations (e.g., storage drives, file folders, a user's desktop environment, etc.) from which content should not be identified as being of interest to that user.

The second example of a user editing his or her own user profile 128 is particularly useful in ensuring that the related content identified with that user's user profile 128 is presented to the user in the most useful manner possible. In more detail, a user can select the format and location in which related content is accessed and presented to that user so as to ensure that the user is able to optimize the accessibility and visibility of that related content. In FIG. 3, for example, the user has selected to have related content 302A-302D presented to him or her as a list of selectable links in a sidebar 302 displayed along an edge of the graphical display 300 provided on a GUI 108.

And the third example of a user editing his or her own user profile 128 is particularly useful in preventing undesirable content from being presented to the user. Moreover, it can be used in conjunction with the other types of user editing to narrow the scope of the content presented to the user to only the specific types and subject matters that are of interest to that user. For example, a user can select to only receive notifications regarding e-mails and internal documents created on other users' GUIs 108, such that the user is not presented with any of his or her own e-mails and/or documents.

After the user profile 128 is generated at step 202, it will be actively updated based on the that user's activity within the communications system 100 and, in particular, that user's activity on a GUI 108 within an enterprise network. Depending on whether and how that user edits his or her user profile 128, his or her user profile 128 may also be actively updated based on other users' activities within that enterprise network and/or within the communications network 100. That activity largely includes accessing files, network sites, and other content within the enterprise network and/or within the communications network 100, which occurs at step 204 of the process for identifying related content 200. And because a user's user profile 128 is actively updated based on different instances of that activity, steps 202 and 204 are performed in a cyclical manner with respect to each other, as illustrated in FIG. 2.

2. Step 204: Accessing and Viewing Files, Network Sites, Etc.

At step 204 of the process for identifying related content 200, a user accesses (i.e., opens, retrieves, navigates to, etc.) and views files, network sites, and/or other content in a graphical display 300 provided on the GUI 108 to which that user is logged on. As illustrated in FIG. 3, that content may include a multimedia application 304, a web browser application 306, and an e-mail application 308. The user is currently working in the web browser application 306 in the graphical display 300 of FIG. 3, which is why its window is fully visible and overlapping the windows in which the multimedia application 304 and the e-mail application 308 are displayed. Similarly, the user worked least recently in the multimedia application 304, which is why it is only partially visible behind both the web browser application 306 and the e-mail application 308. And the user worked in the e-mail application 308 after working in the multimedia application 304, but before working in the web browser application 306, which is why it appears to be located in front of the multimedia application 304 and behind the web browser application 306.

Although the user is only described as currently "working in" the web browser application 306 in the graphical display of FIG. 3, the arrangement of the windows in which the applications 304-308 are displayed indicates that the user is at least actively viewing both the window in which the web browser application 306 is displayed and the window in which the e-mail application 308 is displayed. In other words, the user has arranged those windows so he or she can concurrently view the content in both of them, which is common practice when performing work with a GUI 108. And although the user has arranged those windows in an overlapping relationship in the graphical display 300 of FIG. 3, they may also be arranged adjacent to one another so that each window is entirely visible, or in a combination of overlapping and adjacent relationships so that two or more windows are entirely visible and one or more windows are only partially visible. In addition, although only one instance of each application 304-308 is illustrated in the graphical display 300 of FIG. 3, such a graphical display 300 may also include multiple instances of the same application.

3. Step 206: Indentify Areas of Focus in Files, Network Sites, Etc.

As the user is viewing files, network sites, and/or other content at step 204, his or her eyes move across the graphical display 300. At step 206, the eye tracker 110 tracks the user's gaze patterns as his or her eyes move across the graphical display so the ET software 114 can identify the fixation locations on which that user's eye focus. In FIG. 3, for example, the eye tracker may track the user gazing at the text in the main frame of the web browser application 306 and the text in the reading pane of the e-mail application 308 for a predetermined amount of time, based upon which the ET software 114 will identify the corresponding areas in the graphical display 300 as fixation locations, or points of interest, for that user. As that example demonstrates, step 206 may include identifying fixation locations in two or more windows concurrently being displayed in the graphical display 300, regardless of which application 306-308 that user is currently working in, and regardless of whether one window is partially hidden behind another.

4. Step 208: Extract Keywords from Files. Network Sites, Etc.

At step 208 of the process for identifying related content 200, keywords are extracted from the fixation locations identified at step 206. As discussed above, the ET software 114 maps the item or items (i.e., text, an image, etc.) closest to the predefined areas that correspond to the fixation locations and extracts the corresponding textual data from that item for use as keywords. In the graphical display 300 of FIG. 3, for example, the ET software extracts the text in the main frame of the web browser application 306 and the text in the reading pane of the e-mail application 308. Depending on the size of the predefined areas and the fixation locations, that text may include a single word, an entire paragraph, a series of words or paragraphs, or a block of text. Accordingly, instead of extracting keywords from the entire file, network site, or other content that the user is viewing, the disclosed embodiments extracts keywords only from the specific areas on which the user has focused within those files, network sites, and other content, thereby making the extracted keywords a more accurate reflection of the user's actual interests.

Preferably, the eye tracker 110 and ET software 114 map fixation locations to a single word so as to provide the most accuracy when identifying keywords. Although a user will typically be reading through a series of words in the graphical display 300 such that, in a general sense, he or she will not pause on a specific word for a prolonged period of time, the eye tracker 110 and ET software 114 can identify pauses that last only a minute amount of time (e.g., ~0.04 seconds). Accordingly, specific fixation locations can be mapped to specific words even under conditions where the user is reading through a series of words without apparent pause. The ET software 114 may also map a fixation location to images in a similar manner.

Based on the words to which the user's fixation locations are mapped, keywords are extracted for use in identifying other content that may be of interest to that user. As those keywords are extracted, they are accumulated into potential search strings. And although fixation points may be mapped to a plurality of different words, a particular keyword or set of keywords may be identified from among those different words for use in a search string based on different eye movement and textual features measured by the eye tracker 110 and ET software 114, such as the number of fixations on the word, the duration of each fixation on the word, returns to the same fixation locations, the distance (e.g., in pixels) between fixation locations mapped to the word, length of the word, and/or the position of the word divided by the total number of words in a line, paragraph, or page. A particular keyword or set of keywords also may be identified from among different words for use in a search string based on their being mapped to fixation points in a plurality of different windows, such as the windows in which the web browser application 306 and the e-mail application 308 are displayed in the graphical display 300 of FIG. 3. Thus, a keyword or set of keywords used in an actual search string may be defined as function of repeated appearance in the mapped text, weighted by the number of windows that the user is concurrently viewing in which those keywords appeared. A particular keyword or set of keywords may even be identified from among different words for use in a search string based on their relation to an application the user has worked or is currently working in on a GUI 108.

In FIG. 3, for example, the word "visualization" may be identified for use as a keyword when it is mapped to a plurality of fixation points in both the web browser application 306 and the e-mail application 308 as the user views the graphical display 300. The word "visualization" may also be identified for use as a keyword because it appears in both the title of the article displayed by the web browser application 306 and the subject line of the e-mail displayed by the e-mail browser 308, and/or because it appears multiple times in both of those windows. Moreover, the multimedia application 304 may be one associated with creating visualizations (e.g., security visualization software, database visualization software, etc.). Accordingly, the word "visualization" may even be identified for use as a keyword because the user is working in a multimedia application 304 that is associated with visualizations. Thus, step 208 may include identifying the word "visualization" based on any one of, or any combination of, those identifying techniques.

Continuing with the example of the graphical display 300 illustrated in FIG. 3, the user's eyes paused momentarily (e.g., for about 0.04 seconds) on the word "visualization" as he or she is reading the article displayed by the web browser application 306 and the e-mail displayed by the e-mail browser 308, thereby resulting in that word being identified as a point of interest for that user. Although that user's eyes may not have paused on each instance of that word in the article and the e-mail, they did so with enough frequency and consistency with respect to other words that the word "visualization" was identified for use as a keyword. Moreover, the fact that the user's eyes paused on the word "visualization" in more than one window that the user was concurrently viewing resulted in that word being weighted more heavily for use as a keyword. Further, the word "visualization" appears in the title of the article, the subject line of the e-mail, and multiple times in the bodies of the article and e-mail, which also resulted in the word "visualization" being identified for use as a keyword. Accordingly, the related content 302A-302D displayed in the sidebar 302 illustrated in FIG. 3 all relates to "visualization." It also relates to the term "workshop" because that word has also been identified for use as a keyword—for example, because the user's eyes paused on that word and his or her user profile 128 indicated an interest in workshops.

When fixation points are mapped to images rather than text, keywords can be extracted from the information associated with those images. For example, keywords can be extracted from the text in an area adjacent to an image. Such text may be identified as describing the image when it includes words typically used to indicate such a description, such as "Figure" and "Table." Keywords can also be extracted from the metadata associated with an image, such as the name assigned to the image when it was created. Thus, extracting keywords based on fixation locations that are mapped to images may include extracting keywords from the text adjacent to the image and/or from the metadata associated with that image. A similar technique may also be used to extract keywords from links to audio or video files.

In addition, although specific keywords cannot be extracted directly from audio or video files, the browser 112 or the ET software 114 may extract transcribe text corresponding to any words spoken in audio or video files with automated transcription functionality if and when a user opens those files. The ET software 114 will then extract keywords from the transcribed text. And, instead of utilizing fixation points identified from a user's gaze patterns, the ET software 114 may utilize fixation points identified from a user's playback patters. For example, if a user replays a certain portion of an audio or video file, that portion of the audio or video file will be identified as a fixation point such that the text transcribed from that portion will be weighted more heavily for use as a keyword. Similarly, if a user pauses an audio file or video file at a particular time during playback, the text transcribed from the words spoken at or around that point will be weighted more heavily for use as a keyword. The transcription functionality that transcribes those words to text may perform in the background so a user does not realize the audio or video file that he or she opened is being transcribed. In the alternative, the user may be presented with the transcribed text so that he or she may verify that the spoken words were correctly transcribed.

In addition to extracting keywords from the content and/or applications 304-308 a user has open, is currently working in, and/or is currently viewing, step 208 may also include extracting keywords from the content and/or applications 304-308 that user, or another user (e.g., another user with a similar organizational role or similar interests), previously opened, worked in, and/or viewed, such as files stored on that user's GUI 108 and/or websites, e-mails, and documents that the user recently worked in and/or viewed. Keywords also may be extracted directly from a user's user profile 128. Preferably, however, a combination of the above identifying techniques is utilized to extract keywords so as to provide as robust a view as possible of the user's interests.

Step 208 is preferably performed with extraction techniques and/or algorithms performed at the client system 102, using the GUI 108, so as to provide more privacy to the user by restricting the extraction of keywords to client-side processing. Such client-side processing also allows that user to select the web browser that will be used and the domains that will be searched for related content. As discussed above, those user selections may be stored in that user's user profile 128. Nevertheless, at least a portion of that processing may be performed at the server 104, such as extracting keywords from files and other users' profiles 128 stored on the storage device 116 of the server 104.

5. Step 210: Search for Related Files, Network Sites, Etc.

As keywords are extracted from files, network sites, and other content at step 208, those keywords are used to update the user's user profile 128 at step 202 and to search for related files, related network sites, and other related content at step 210. At step 202, the keywords are added to a list of keywords and search strings that generally define the user's interest. The keywords may also be associated with the documents from which they were extracted so they can be used to identify that document as related to that user's interests, or another user's interests, based on those keywords. And at step 210, the context-based search strings accumulated from the keywords are used to search for files, network sites, and other content that is related to those keywords. That search may include the files, network sites, and other content that are available on the enterprise network, as well as the files, network sites, and other content that are available on public networks within the communications system 100, such as the Internet. As discussed above, however, the user can limit the scope of that search by editing his or her user profile 128 accordingly.

Also at step 210, the keywords and search strings previously stored in a user's user profile 128 may be used in combination with the keywords and search strings that are extracted from the files, network sites, and other content the user is currently viewing to search for related files, related network sites, and other related content. Other information previously stored in a user's user profile 128 may also be used to search for related files, related network sites, and other related content. For example, keywords may be extracted from the user's organizational role (e.g., the user's job title, team or business unit, etc.) or project involvement (e.g., the user's role on the project, the name of the project, etc.) and used to search for such related content. The user's organizational role also may be used to identify related files, related network sites, and other related content that were previously identified as being of interest to other users with the same or a similar organizational role. Similarly, the interests identified in a user's user profile 128 may be used to identify related files, related network sites, and other related content that were previously identified as being of interest to other users with similar interests identified in their respective user profiles 128.

Such related content may include substantially any form of electronically readable media, including but not limited to websites, text documents, spreadsheets, slide shows, portable document format (PDF) documents, images, audio or video files, e-mails, and calendar events. They are identified as "related" to a user's interests based on any combination of the factors discussed above. In FIG. 3, for example, the search string "visualization workshop" may be used in conjunction with the user's organizational role and/or previously-identified interests to search for content on the enterprise network and the Internet from which similar keywords have been extracted, and which has been identified as being of interest to users with the same or a similar organizational role and/or similar interests to the subject user. The results of that search include a report 302A on visualization and interoperability, an article 302B on how different roles demand different visualization formats, a homepage 302C for a scientific visualization workshop, and an announcement 302D for a workshop being offered on visualization.

By way of illustrative example, the report 302A may have been identified as related to the user's interests because it includes the keyword "visualization" and was generated by a different user that has the same or a similar organizational role as that user within the same organization or enterprise; the article 302B may have been identified as related to the user's interests because it includes the keyword "visualization" and was recently viewed by a different user that also recently viewed the same website the user is currently viewing with the web browser application 306; the homepage 302C may have been identified as related to the user's interests because it is the most relevant website to the keywords "visualization" and "workshop" based on the search technique utilized; and the announcement 302D may have been identified as related to the user's interests because it includes the keywords "visualization" and "workshop" and that user's user profile 128 indicates that he or she attended a similarly-named workshop in the past. Accordingly, content may be identified as being related to a user's interests based on any combination of factors, as well as the search technique utilized. And, as discussed above, the results of that search may be obtained from within the enterprise network in which the user is working, as well as from public networks, such as the Internet. As FIG. 3 illustrates, the report 302A and the article 302B were obtained from within the enterprise networks (e.g., from the server 104 or another GUI 108 within that enterprise network), while the homepage 302C and the announcement 302D were obtained from the Internet (e.g., from websites hosted within the communications system 100).

To support searches of the enterprise network, the server 104 is further configured to analyze and extract keywords from the files, network sites, and other content stored in its storage device 116. The server 104 may also analyze and extract keywords from the files, network sites, and other content stored in the storage devices of the GUIs 108 within that enterprise network in a similar manner. The server 104 may extract keywords from that stored content based on the text within those files, network sites, and other content and/or the metadata associated with those files, network sites, and other content. And the server 104 will store those keywords in its storage device 116 as an index, or inverted file, that points to the specific content associated with each keyword. A copy of that index may also be stored on the storage device of one or more GUIs 108 within the enterprise network so that it can be more readily accessed by those GUIs 108.

Search engines elsewhere in the communications system 100 maintain similar indexes for the files, network sites, and other content hosted on the Internet. But as that content is accessed and viewed by users within the network enterprise, it will be added to the index stored on the storage device 116 of the server 104 and/or the storage devices of the GUIs 108 within the enterprise network. Accordingly, that content can be quickly identified within the network enterprise without relying on those external search engines. The index stored on the storage device 116 of the server 104 and/or the storage devices of the GUIs 108 therefore includes pointers to content that can be located anywhere within the communications system 100, including a user's own GUI 108 (e.g., the user's own files, e-mails, etc.) and the Internet (e.g., websites and files hosted outside the enterprise network, etc.).

The index stored on the storage device 116 of the server 104 and/or the storage devices of the GUIs 108 within the enterprise network may also include the organizational roles and/or interests of the users that have viewed, saved, created, or edited a particular file, network site, or other content. Like keywords, those organizational roles and/or interests are used to point to the specific content associated therewith. Moreover, they can be used in conjunction with the keywords to further narrow a search. For example, a search for files, network sites, and other content associated with a specific keyword can be narrowed from all such content to only the content that is associated with both the specific keyword and a specific organizational role.

In addition, organizational roles and/or interests can also operate as keywords to inform a search. In FIG. 3, for example, the organizational role "computer programmer" for a user working on visualization software may inform the searching functionality of step 210 to look for files, network sites, and other content in which the work "visualization" is used with respect to software, rather than in its broader sense. Accordingly, such information may also be used for the disambiguation of search terms.

The search functionality of step 210 is primarily supported by the browser 112 on the GUI 108. As the ET software 114 extracts keywords from the files, network sites, and other content the user is viewing on the GUI 108 at step 208, the browser 112 will search the various indexes discussed above for matching keywords, organizational roles, and/or interests. If any matches are found, the content they point to is identified as "related." And because the search may include other users' GUIs 108, that related content may include both "published" content (i.e., files, network sites, and/or other content made available for distribution across the enterprise network, or beyond) and "unpublished" content (i.e., files, network sites, and/or other content that are only available locally within a particular user's GUI 108). For that reason, access to "unpublished" content may be governed by access control methods. For example, a user's access to certain content may be defined in that user's user profile 128, by project management software, or some combination thereof. Access control measures may also be enacted by the author or creator of the "unpublished" content.

6. Step 212: Filter and Rank Related Files, Network Sites, Etc.

After related content is located in step 210, the search results are filtered and ranked at step 212. Those results are filtered to remove undesirable and/or authorized content. And those results are ranked based on which content is most likely to be relevant to a user's interests. Both the filtering and ranking processes take into account a plurality of factors so as to ensure only appropriate and pertinent content is presented to the user at step 214.

Among the factors taken into account when filtering the search results from step 210 are user preferences, organizational roles, and access controls. As discussed above, user preferences can be established within a user's user profile 128, such as by identifying the types of content (e.g., e-mails, calendar events, internal documents, etc.) and even the subject matter (e.g., upcoming meetings and forums, internal reports, etc.) for which he or she would like to receive notifications. As also discussed above, organizational roles and access controls can also be set in a user's user profile 128. It can also be set in project management software, GRC software, or other access control software. Unlike user preferences, however, a user is generally not able to edit those settings. Instead, it is typically set by administrators within the enterprise network.

For filtering purposes, organizational roles and access controls may be interrelated because the content to which a user is granted access is typically determined by that user's organizational role. For example, supervisors may be provided access to a broader scope of content than the employees that they supervise. Moreover, certain content, although relevant to a user's interests or job, may be deemed confidential or otherwise restricted to certain users. Such restrictions may occur for many reasons, including but not limited to proprietary information or senior management considerations. Accordingly, the filtering performed at step 212 not only filters out the content that is not of the types and/or does not include the subject matter identified as being of interest to that user, it also filters out the content to which that user is not allowed access.

Among the factors taken into account when ranking the search results from step 210 are relevancy, popularity, and urgency. Relevancy is the extent to which a file, network site, or other content corresponds to the keywords, organizational role, and/or interests of a user; and the extent to which users with similar or the same keywords and/or interests have accessed and viewed that content. Popularity is the extent to which the keywords extracted from a user's fixation locations correspond to the keywords extracted for the fixation locations of users with the same organizational role and/or project involvement. And urgency is the extent to which a file, network site, or other content is important and/or time sensitive. Each of those factors is addressed separately below in more detail.

Relevancy takes into account the keywords extracted from the content that the user is currently viewing by ranking content higher when it relates more closely to the area of interest identified with those keywords. Relevancy may also take into account any keywords and/or interests already associated with a user in that user's user profile 128 so as to rank content higher when it also relates to those keywords and/or interests. And relevancy may take into account a user's organizational role so as to rank content higher when it has been identified as being of interest to users with the same or a similar organizational role. Each of those forms of relevancy may be weighted and used together to determine the extent to which a file, network site, or other content corresponds to the keywords, organizational role, and/or interests of the user. For example, a document with a title and numerous paragraphs that include the keywords extracted from the content the user is currently viewing, and which users with the same interests and organizational role have previously accessed, will be ranked more highly than a document that merely includes a few instances of the keywords.

Relevancy also takes into account the access history of a file, network site, or other content by ranking that content higher when it is statistically more likely that a user will access and view the corresponding file, network site, or other content based on its access history. Relevancy may also take into account a user's organizational role and/or interests so as to rank content higher when it is statistically more likely that a user will access and view the corresponding file, network site, or other content based on his or her having the same or similar organizational role and/or interests as the other users that have accessed and viewed that file, network site, or other content. Content that has been accessed and viewed by a large number of other users based on similar keyword extractions—particularly users with the same or similar organizational role and/or interests as the subject user—is statistically more likely to be of interest to the user for whom those keywords were most recently extracted than content that was accessed and viewed less frequently by those other users.

In addition to the access history created by others, a user's own access history may also be used to determine the relevancy of a file, network site, or other content. In FIG. 3, for example, the user is presented with a list of related content 302A-302D in the sidebar 302 while viewing the article displayed by the web browser application 306 and the e-mail displayed by the e-mail application 308. When that user selects a file, network site, or other content from among the related content 302A-302D displayed in the sidebar 302, the ranking of the selected content will be increased for all users that subsequently access and view the article displayed by the web browser application 306 and/or the e-mail displayed by the e-mail application 308, including the user currently viewing the article displayed by the web browser application 306 and the e-mail displayed by the e-mail application 308.

Similarly, if the user utilizes the browser 112 to access and view any other file, network site, or other content while viewing the article displayed by the web browser application 306 and the e-mail displayed by the e-mail application 308, even when that content is not listed among the related content 302A-302D in the sidebar 302, that other file, network site, or other content will also receive an increased ranking for all users that subsequently access and view the article displayed by the web browser application 306 and/or the e-mail displayed by the e-mail application 308, including the user currently viewing the article displayed by the web browser application 306 and the e-mail displayed by the e-mail application 308. For example, opening another instance of the web browser application 306 and viewing a different website will result in that different website being identified as related to the article already being displayed by the instance of the web browser application 306 already opened in FIG. 3. It will also result in that different web site being ranked higher when it is identified as being related to any file, network site, or other content viewed by that user, or by a user with a similar organizational role and/or similar interests. Accordingly, other content is intuitively identified as being related to the content currently being viewed based not only on a user's eye movements, but also on that user's other activities—in particular, accessing and viewing other content not identified as related content 302A-302D in the sidebar 302. In that manner, one user can enjoy the benefits of another user's research efforts. And if the user so chooses, such content will be identified not only from the enterprise network in which that user is working, but also from elsewhere in the communications system 100 (e.g., the Internet).

Popularity takes into account the number of times a frequency with which users with the same organizational role and/or project involvement fixate on the same word or words. For example, a plurality of users may be grouped together based on their involvement in common project by assigning them to a common group in their respective user profiles at step 202. Based on that grouping, keywords extracted from those user's fixation locations at step 208 are correlated to determine commonality and frequency between the users of the group. Accordingly, the keywords most frequently extracted and/or most common among the group, as well as their associated content, will be ranked higher to further ensure it is brought to the group's attention.

Urgency takes into account the temporal sensitivity and importance of a file, network site, or other content by ranking that content higher when it is time-sensitive and/or of high importance. For example, a large number of files, network sites, and other content may be identified as related content 302A-302D by the search at step 210, some of which may be identified as urgent or of high importance. Such content may include e-mails and internal documents marked as "important" and/or calendar events that are approaching their scheduled dates. Content other than calendar events may also be identified as time-sensitive by extracting any dates contained therein. Accordingly, that content will be ranked higher to further ensure it is brought to the user's attention.

Together, relevancy, popularity, and urgency are used to place the related content 302A-302D displayed in the sidebar 302 in descending order of likelihood of interest so that the user sees the related content 302A-302D that is most likely to be of interest to him or her first. For example, a file identified as being related to a user's interests based on a search of keywords extracted from a plurality of windows concurrently being displayed on a GUI 108 will be displayed higher on the sidebar 302 when that file was also viewed by a different user with a similar organization role and/or interests to the user currently viewing content at the GUI 108 after being presented to that different user in response to a search using similar keywords, while a file that the different user chose not to view in response to the search using similar keywords will be displayed lower on the sidebar 302. That is because the latter file is less likely to be of interest to the user currently viewing content at the GUI 108 in light of that user's similar organizational role and/or interests with the different user that chose not to view that file. Either of those files also may be displayed higher or lower on the sidebar 302 based on urgency. Accordingly, the most relevant, popular, and urgent files, network sites, and other content will be displayed in more predominant positions in the sidebar 302 than other content.

In FIG. 3, for example, the report 302A on visualization and interoperability is ranked most highly in terms of its likelihood of being of interest to the user from among the related content identified on the enterprise network, while the article 302B on how different roles demand different visualization formats is ranked just below that. And the homepage 302C for a scientific visualization workshop is ranked most highly in terms of its likelihood of being of interest to the user from among the related content identified on the Internet, while the announcement 302D for a workshop being offered on visualization is ranked just below that. Although FIG. 3 illustrates files, network sites, and other content as being listed separately based on whether it was obtained from the enterprise network or the Internet, that content may all be listed together and ranked with respect to each other, or it may be separated out and ranked on a more granular basis, such as by the server or file folder from which it was obtained. A user may set that preference by editing his or her user profile 128 in a similar manner to that discussed above with respect to the other user preferences.

7. Step 214: Notify User of Related Files, Network Sites, Etc.

After the related content 302A-302D is filtered at step 212, the user is notified of that content's existence at step 210. In FIG. 3, for example, that notification takes the form of a sidebar 302 that includes selectable links (e.g., hyperlinked text, a button adjacent to descriptive text, etc.) that the user can select to access and view the corresponding file, network site, or other content. The notification may also take any of several other forms, such as a text document, a spreadsheet, a pop-up window, a series of tabs, a website, an e-mail, or a Short Message Service (SMS) text message that includes similar selectable links. The browser 112 is configured to navigate the user to the corresponding file, network site, or other content when he or she clicks on, or otherwise selects, any of those selectable links.

Each selectable link may also take any of several different forms. In FIG. 3, for example, the selectable link may include the title of the related file, network site, or other content. The selectable link also may include at least a portion of the body text from the related file, network site, or other content (e.g., the first paragraph of text from a text document). Further, the selectable link may include phrases extracted from the corresponding file, network site, or other content that include the keywords used to indentify that content as related to the user's interests. Further still, the selectable link may include the location (e.g., the file path, Uniform Resource Locator (URL), etc.) for the corresponding file, network site, or other content. Moreover, each selectable link may include any combination of those forms. And a user may set that preference for each type of content by editing his or her user profile 128 in a similar manner to that discussed above with respect to the other user preferences (e.g., title and location for text documents, title and keyword phrases for network sites, and a portion of the body text for other content).

In addition, notifications may further include selectable buttons or controls by which the user may indicate whether the related content 302A-302D identified via steps 206-214 is helpful and/or whether the user desires to know more with respect to any of that content. In the former instance, the corresponding content will receive a higher ranking in the future for that user and different users with similar organizational roles and/or interests. Similar content may also be ranked higher and presented to the user based on an indication that the content was helpful, with the inverse being true for content identified as not being helpful such that the corresponding content is removed from the sidebar 302. And in the latter instance, the user will be provided with more information related to the corresponding content, such as by maximizing the sidebar 302 into a larger window, re-directing the user to a website, opening a relevant document (e.g., a text document, a slideshow presentation, a spreadsheet, etc.), opening an appointment in a calendar application, and/or adding a calendar event to the user's calendar application. Indicating that the user desires more information related to the corresponding content may also result in that content and/or similar content receiving a higher ranking in the future for that user and different users with similar organizational roles and/or interests.

By way of more specific example, the related content 302A-302D may include selectable "Yes" and "No" buttons beside the text "Was this helpful?," wherein selecting the "Yes" button will result in that user's profile being updated at step 202 to identify a preference for that type of content and the ranking of the corresponding content being increased at step 212 to indicate a greater likelihood of being interest to that user. That increased ranking may be used in the future for both that user and other users, such as when step 210 identifies the same document for other users in response to similar keywords. User profiles 128 and rankings are similarly updated based on content that users ignore or do not find helpful. Thus, if the same file, network site, or other content is repeatedly presented to a user and that same user continually fails to select that content, that user's user profile 128 and that content's ranking will be updated to reflect that perceived preference.

Returning to the example of FIG. 3, the sidebar 302 operates as a visualizer that displays related content 302A-302D at a periphery of the graphical display 300. The sidebar 302 is sized so that it is clearly visible to the user without substantially interfering with the other windows in which that user currently viewing content. Although those other windows may overlap with each other, they do not overlap with the sidebar 302 so as to ensure that the related content 302A-302D displayed in the sidebar 302 remains visible and selectable to the user as that user views the files, network sites, and other content displayed in the other windows.

At step 214, the sidebar 302 is dynamically updated as the user views the files, network sites, and other content displayed in the other windows. For example, as the user reads the article displayed by the web browser application 306 and the e-mail displayed by the e-mail application 308 in the graphical display 300 of FIG. 3, steps 206-214 are performed to identify, filter, rank, and display the corresponding related content 302A-302D in the sidebar 302 based on the keywords "visualization" and "workshop." As the user reads further and/or opens other applications, steps 206-214 continue such that the sidebar 302 is updated as other keywords are identified. Accordingly, as a user accesses and views different files, network sites, and other applications at step 204, the eye tracker 110 and ET software 114 continue to monitor the user's gaze patterns and extract keywords at steps 206 and 208, while the browser 112 continues to search for, identify, rank, filter, and display the related content 302A-302D associated with those keywords at steps 210-214. Thus, the method for identifying related content 200 performs in a continuous, cyclical manner, wherein a user's user profile 128 is updated at step 202 each time that user accesses and views content at step 204 and/or keywords are extracted from that content at step 208. And the ranking of that content is increased for that user and other users with similar organizational roles and/or interests at step 212 each time that user accesses and views content at step 204.

It should be understood that some of the steps of the method for identifying related content 200 illustrated in FIG. 2 can be combined, modified, or deleted where appropriate, and that additional steps may also be added. It should be further understood that the method for identifying related content 200 illustrated in FIG. 2 can be performed separately and simultaneously for a plurality of users, wherein the steps in one user's process are used to update the user profiles in another user's process.

C. Overview

As described above, the disclosed embodiments provide a system, apparatus, and method for more accurately determining a user's interests from the content he or she views. More specifically, the disclosed embodiments more accurately identify a user's interests by using that user's eye movements to identify the keywords or phrases on which that user focuses while concurrently viewing a plurality of files, networks sites, and other content accessed within the communications system 100. Thus, the disclosed embodiments are able to specifically identify what piques the user's interest within that content, rather than merely generally characterizing that content in terms of the text contained therein. As discussed above, the latter is more likely to reflect the interests of the author of the content than the interests of the user who is accessing and viewing that content.

The disclosed embodiments not only provide a system, apparatus, and method that more accurately identify a user's interests, they also identify and present content related to those interests in a more meaningful manner. More specifically, user profiles 128 and content rankings are dynamically updated in a persistent manner as different users access and view different content within the communications system 100. Thus, after a user profile 128 is generated, it will be updated based on that user's reaction to the related content presented in response to the content that user is currently viewing. The ranking of that related content will also be updated based on that user's reaction thereto. Moreover, similar updates occur as a result of the reactions of users with similar organizational roles and/or interests to the same or similar content. Accordingly, each user benefits from each other user's reactions to content so that it can be ranked accordingly and presented to each user based on its likelihood of being of interest to that user.

By ranking content based on a plurality of different users' reactions to that content and the corresponding related content, the disclosed embodiments "learn" from those users and provide results that are more likely to be helpful to each particular user. Accordingly, the more content that users access and view with the disclosed embodiments, the more accurately the disclosed embodiments will be able to identify content that is of interest to each particular user. That accuracy is improved even further as more and more users utilize the disclosed embodiments because there will be more and more data with which to determine ranking factors, such as relevancy. Thus, as the disclosed embodiments gain become more commonly and frequently used, they will also gain efficacy and accuracy.

In addition, by maintaining an index of keywords, organizational roles, and/or interests that points to different content, the disclosed embodiments allow that content to be characterized with respect to users' interests rather than the interests of the authors of the content. It also allows that content to be filtered and ranked by those keywords, organizational roles, and/or interests so as to further ensure that only the documents that are most likely to be of interest to a user are presented to that user. Accordingly, the disclosed embodiments at least provide a system, apparatus, and method for more accurately determining a user's interests from the content he or she accesses and views.

The foregoing description and drawings should be considered as illustrative only. The disclosed embodiments may be configured in a variety of shapes and sizes and are not intended to limit the scope of the invention. Numerous other embodiments and applications of the invention will readily occur to those skilled in the art in view of the disclosed embodiments. Therefore, it is not desired to limit the invention to the specific example embodiments disclosed or the exact construction and operation shown and described. Rather, all suitable modifications and equivalents may be resorted to, falling within the scope of the invention.

What is claimed is:

1. A system for identifying related content, comprising:
   an output device configured to display different content to a user concurrently in two or more windows of a graphical user interface;

an eye tracker configured to identify one or more areas in each of the two or more windows where a user's eyes focus; and
a processor configured to:
extract one or more keywords from the one or more areas where the user's eyes focus in each of the two or more windows;
search a communications network for related content using the one or more keywords; and
notify the user of the related content.

2. The system of claim 1, wherein the processor is further configured to extract the one or more keywords from the one or more areas in which the user's eyes pause for a predetermined amount of time.

3. The system of claim 1, wherein:
the two or more windows are software application windows;
the output device is a computer screen; and
the processor is further configured to extract the one or more keywords from at least one of:
text adjacent to at least one of an image and a link to file on which the user's eyes pause for a predetermined amount of time;
text transcribed from at least one of an audio file and a video file opened by the user; and
metadata associated with at least one of an image and a link to a file on which the user's eyes pause for a predetermined amount of time.

4. The system of claim 1, wherein the processor is further configured to select at least one of the one or more keywords to use in the search based on a number instances in which the at least one selected keyword is extracted from the two or more windows, weighted by a number of the two or more windows from which the at least one selected keyword is extracted.

5. The system of claim 1, wherein the processor is further configured to rank the related content based on at least one of relevancy, popularity, and urgency.

6. The system of claim 5, wherein the processor is further configured to filter the related content based on at least one of user preferences, organizational roles, and access controls.

7. The system of claim 5, wherein
the processor is configured to rank the related content based on popularity such that more popular content is ranked higher than less popular content;
content is identified as being more popular when that content was previously viewed by a user when identified as related data in response to a same or similar search; and
content is identified as being less popular when that content was previously not viewed by a user when identified as related data in response to the same or similar search.

8. The system of claim 1, wherein the processor is further configured to
generate a user profile that includes the user's interests; and
update the user profile when at least one of the following occurs:
that user views any portion of the related content, and
a user with the same or similar interests views any portion of the related content.

9. The system of claim 1, wherein the processor is further configured to:
generate a user profile that includes a user's organizational role; and
update the user profile when at least one of the following occurs:
that user views any portion of the related content, and
a user with the same or similar organizational role views any portion of the related content.

10. The system of claim 3, wherein the processor is further configured to notify the user of the related content by displaying the related content on the output device concurrently with the two or more windows.

11. A method for identifying related content, the method being encoded on a non-transitory computer-readable medium and executed by a processor to perform the steps of:
displaying different content to a user concurrently in two or more windows in a graphical user interface on an output device;
identifying one or more areas in each of the two or more windows where a user's eyes focus using an eye tracking device;
extracting one or more keywords from the one or more areas where the user's eyes focus in each of the two or more windows;
searching a communications network for related content using the one or more keywords; and
notifying the user of the related content.

12. The method of claim 11, wherein the step of extracting the one or more keywords comprises extracting the one or more keywords from the one or more areas in which the user's eyes pause for a predetermined amount of time.

13. The method of claim 11, wherein
the two or more windows are software application windows;
the output device is a computer screen; and
the step of extracting the one or more keywords comprises extracting the one or more keywords from at least one of:
text adjacent to at least one of an image and a link to file on which the user's eyes pause for a predetermined amount of time;
text transcribed from at least one of an audio file and a video file opened by the user; and
metadata associated with at least one of an image and a link to a file on which the user's eyes pause for a predetermined amount of time.

14. The method of claim 11, further comprising the step of selecting at least one of the one or more keywords to use in the search based on a number instances in which the at least one selected keyword is extracted from the two or more windows, weighted by a number of the two or more windows from which the at least one selected keyword is extracted.

15. The method of claim 11, further comprising the step of rank the related content based on at least one of relevancy, popularity, and urgency.

16. The method of claim 15, further comprising the step of filtering the related content based on at least one of user preferences, organizational roles, and access controls.

17. The method of claim 15, wherein the step of ranking the related content includes ranking the related content based on popularity such that more popular content is ranked higher than less popular content, wherein content is identified as being more popular when that content was previously viewed by a user when identified as related data in response to a same or similar search, and content is identified as being less popular when that content was previously not viewed by a user when identified as related data in response to the same or similar search.

18. The method of claim 11, further comprising the steps of:
generating a user profile that includes the user's interests; and
updating the user profile when at least one of the following occurs:

that user views any portion of the related content, and
a user with the same or similar interests views any portion of the related content.

19. The method of claim 11, further comprising the steps of:
generating a user profile that includes a user's organizational role; and
updating the user profile when at least one of the following occurs:
that user views any portion of the related content, and
a user with the same or similar organizational role views any portion of the related content.

20. The method of claim 11, wherein the step of notifying the user includes of the related content includes displaying the related content on the output device concurrently with the two or more windows.

* * * * *